United States Patent
Carpenter et al.

(10) Patent No.: US 6,279,085 B1
(45) Date of Patent: Aug. 21, 2001

(54) METHOD AND SYSTEM FOR AVOIDING LIVELOCKS DUE TO COLLIDING WRITEBACKS WITHIN A NON-UNIFORM MEMORY ACCESS SYSTEM

(75) Inventors: Gary Dale Carpenter, Pflugerville; David Brian Glasco, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/259,366

(22) Filed: Feb. 26, 1999

(51) Int. Cl.[7] ...................................... G06F 12/00
(52) U.S. Cl. .................. 711/143; 711/141; 711/142; 711/145; 711/148; 711/168; 710/200
(58) Field of Search .................... 711/143, 141, 711/142, 145, 148, 168; 710/200

(56) References Cited

U.S. PATENT DOCUMENTS 5,829,032 * 10/1998 Komuro et al. .................. 711/141
5,950,228 * 9/1999 Scales et al. ..................... 711/148
6,078,981 * 6/2000 Hill et al. ........................ 710/200
6,085,295 * 7/2000 Ekanadham et al. ............. 711/145

* cited by examiner

*Primary Examiner*—Do Hyun Yoo
*Assistant Examiner*—Vu A. Pham
(74) *Attorney, Agent, or Firm*—Casimer K. Salys; Bracewell & Patterson L.L.P.

(57) ABSTRACT

A method for avoiding livelocks due to colliding writebacks within a NUMA computer system is disclosed. The NUMA computer system includes at least two nodes coupled to an interconnect. Each of the two nodes includes a local system memory. In response to an attempt by a processor located at a home node to access a modified cache line at a remote node via a memory request at substantially the same time when a processor located at the remote node attempts to writeback the modified cache line to the home node, the writeback is allowed to complete at the home node without retry only if the writeback is from what a coherency directory within the home node considered as an owning node of the modified cache line. The memory request is then allowed to retry and completed at the home node.

10 Claims, 6 Drawing Sheets

| COHERENCY STATE | ACTION |
|---|---|
| node 12; Modified | |
| | READ request to node 12 |
| node 12; Pending-modified | |
| | WBC request to node 11 write to system memory 17 |
| node 12; Pending-shared | |
| | Retry READ request from node 12 |
| node 12; Shared | |
| | complete READ request |

Fig. 5

|  | Invalid | Shared | Modified | Pending-modified | Pending-shared |
|---|---|---|---|---|---|
| owning node | n/a | n/a | allow to complete | allow to complete | n/a |
| non-owning | allow to complete | allow to complete and invalidate shared copies | allow to complete and invalidate owning node | retry | retry |

Fig. 6

METHOD AND SYSTEM FOR AVOIDING LIVELOCKS DUE TO COLLIDING WRITEBACKS WITHIN A NON-UNIFORM MEMORY ACCESS SYSTEM

CROSS REFERENCE TO RELATED APPLICATIONS

The present application is related to the following copending United States Patent Applications:

1. Ser. No. 09/259,367 entitled "METHOD AND SYSTEM FOR AVOIDING LIVELOCKS DUE TO COLLIDING INVALIDATING TRANSACTIONS WITHIN A NON-UNIFORM MEMORY ACCESS SYSTEM," filed on even date (IBM docket number AT9-98-089; and
2. Ser. No. 09/259,379 entitled "METHOD AND SYSTEM FOR AVOIDING LIVELOCKS DUE TO STALE EXCLUSIVE/MODIFIED DIRECTORY ENTRIES WITHIN A NON-UNIFORM MEMORY ACCESS SYSTEM," filed on even date (IBM docket number AT9-98-090. All above-mentioned copending applications are assigned to the assignee of the present application.

BACKGROUND OF THE INVENTION

1. Technical Field

The present invention relates to a method and system for data processing in general, and in particular to a method and system for avoiding livelocks within a computer system. Still more particularly, the present invention relates to a method and system for avoiding livelocks due to colliding writebacks within a non-uniform memory access computer system.

2. Description of the Prior Art

It is well-known in the computer arts that greater computer system performance can be achieved by combining the processing power of several individual processors to form a multiprocessor (MP) computer system. MP computer systems can be designed with a number of different topologies, depending on the performance requirements of a particular application. A symmetric multiprocessor (SMP) configuration, for example, is one of the simpler MP computer system topologies that are commonly used, in which resources such as a system memory are shared by multiple processors. The topology name "symmetric" stems from the fact that all processors within an SMP computer system have symmetric access to all resources within the system.

Although the SMP topology permits the use of relatively simple inter-processor communication and data sharing protocols, the SMP topology overall has a limited scalability and bandwidth, especially at the system memory level as the system scale increases. As a result, another MP computer system topology known as non-uniform memory access (NUMA) has emerged as an alternative design that addresses many of the limitations of the SMP topology, at the expense of some additional complexity.

A typical NUMA computer system includes a number of interconnected nodes. Each node includes at least one processor and a local "system" memory. The NUMA topology name stems from the fact that a processor has lower access latency with respect to data stored in the system memory at its local node than with respect to data stored in the system memory at a remote node. NUMA computer systems can be further classified as either non-cache coherent or cache coherent, depending on whether or not data coherency is maintained among caches in different nodes. The NUMA topology addresses the scalability limitations of the conventional SMP topology by implementing each node within a NUMA computer system as a smaller SMP system. Thus, the shared components within each node can be optimized for use by only a few processors, while the overall system benefits from the availability of larger scale parallelism with relatively low latency.

Despite all the various advantages, one particular concern with a NUMA system is the potential livelock problem that arises from the cache coherence protocol. For example, when a processor located at a remote node, which contains a modified copy of a cache line, attempts to cast the cache line out of its cache memory by issuing a writeback request to a home node at the same time a processor located at the home node is attempting to access the same cache line, a livelock situation can occur. Consequently, it would be desirable to provide a method for avoiding the above-mentioned livelock situation caused by colliding writebacks within a NUMA computer system.

SUMMARY OF THE INVENTION

In accordance with the method and system of the present invention, a NUMA computer system includes at least two processing nodes coupled to an interconnect. Each of the two processing nodes includes a local system memory. In response to an attempt by a processor located at a node other than a owning node to access a cache line modified at the owning node via a memory request at substantially the same time when a processor located at said owning node attempts to writeback the modified cache line to the home node, the writeback is allowed to complete at the home node without retry only if the writeback is from what a coherency directory within the home node considered as the owning node of the modified cache line. The owning node is the node with the most recent copy of the cache line exist. The memory request is then allowed to retry and completed at the home node.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

I. Numa System

A. System Overview

Figure 1:
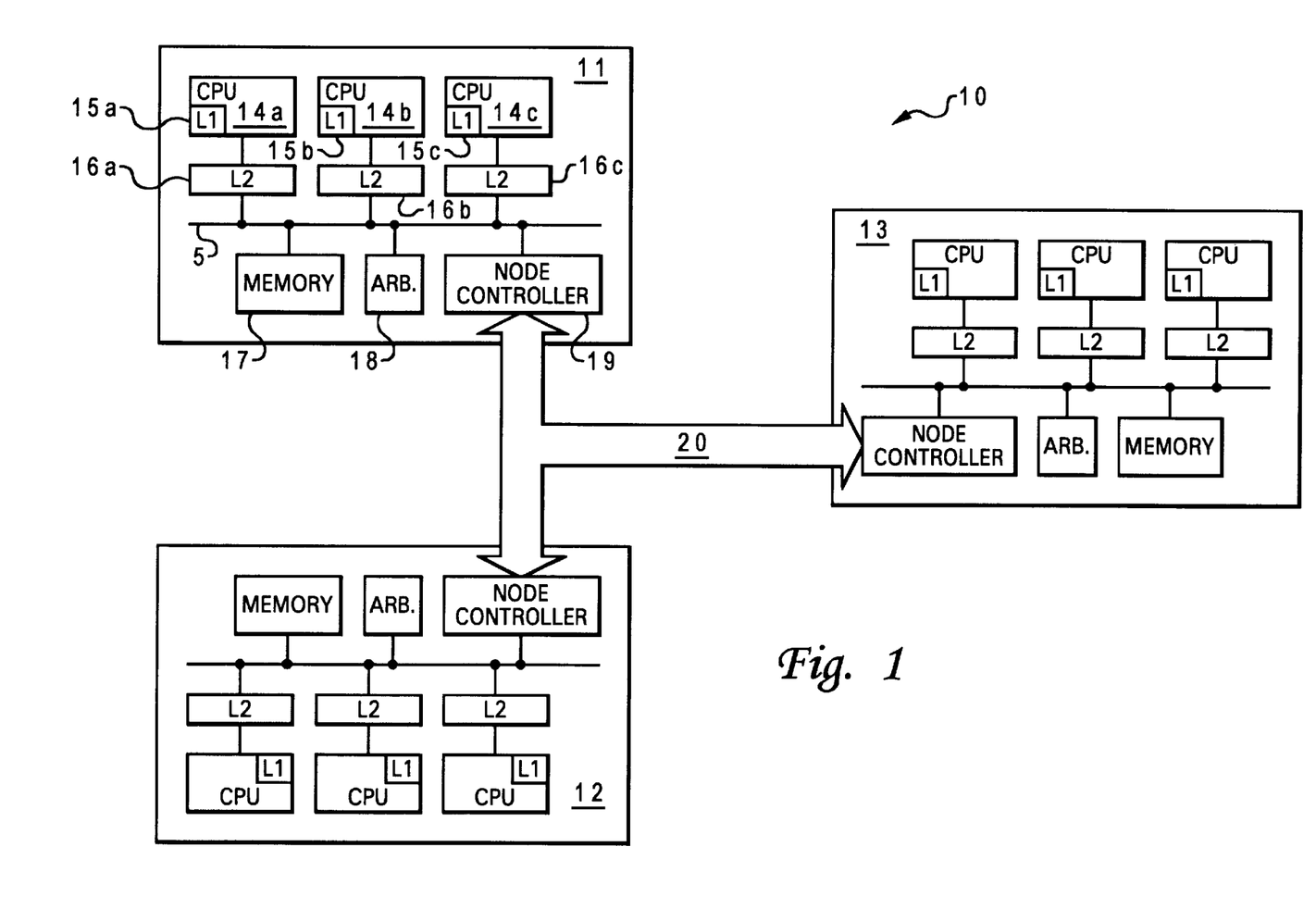
FIG. 1 is a block diagram of a non-uniform memory access (NUMA) computer system in accordance with a preferred embodiment of the present invention.

Referring now to the drawings and in particular to FIG. 1, there is illustrated a block diagram of a non-uniform memory access (NUMA) computer system in accordance with a preferred embodiment of the present invention. The depicted embodiment can be realized, for example, as a workstation, a midrange computer, or a mainframe computer. As illustrated, a NUMA computer system 10 includes processing nodes 11, 12, and 13 that are interconnected by a node interconnect 20. Each of processing nodes 11–13 includes at least one processor. For example, processing node 11 includes processors 14a–14c, all of which are preferably identical with each other.

In addition to registers, instruction flow logic and execution units utilized to execute program instructions, each of processors 14a–14c also includes a respective one of on-chip level one (L1) caches 15a–15c, which together with a respective one of level two (L2) caches 16a–16c is utilized to stage data to one of associated processors 14a–14c from a system memory 17. In other words, L1 caches 15a–15c and L2 caches 16a–16c function as intermediate storage between system memory 17 and processors 14a–14c for data that are likely to be accessed again by one of processors 14a–14c. L2 caches 16a–16c typically have a much larger storage capacity than L1 caches 15a–15c, but at a longer access latency. For example, L2 caches 16a–16c may have a storage capacity of 1–16 megabytes, while L1 caches 15a–15c may only have a storage capacity of 8–32 kilobytes. Although L2 caches 16a–16c are illustrated in FIG. 1 as external to processors 14a–14c, it should be understood that each of L2 caches 16a–16c could alternatively be incorporated within an associated one of processors 14a–14c as another level of on-chip cache memory. Furthermore, it should be understood that additional levels of cache memory (such as level 3, level 4, etc.) could be utilized to provide additional data storage. In this disclosure, each of processors 14a–14c and its associated cache hierarchy, i.e., L1 caches and L2 caches, is considered to be a single snooper.

In addition, each of processing nodes 11–13 further includes a respective node controller, such as a node controller 19 for processing node 11. Together with system memory 17 and L2 caches 16a–16c, node controller 19 is coupled to a local interconnect 5. Node controller 19 serves as a local agent for remote processing nodes 12 and 13 by performing at least the following two functions: (1) node controller 19 snoops communication transactions on relevant local interconnect 5 and facilitates the transmission of local communication transactions to the remote processing nodes 12 and (2) node controller 19 snoops communication transactions on node interconnect 20 and masters relevant communication transactions on an associated local interconnect such as local interconnect 5. Communication on each local interconnect, such as interconnect 5, is controlled by an arbiter, such as arbiter 18. Arbiter 18 regulates any access to local interconnect 5 based on bus request signals generated by any one of processors 14a–14c and compile coherency responses for snooped communication transactions on local interconnect 5. The coherence response phase of local interconnect 5 can be postponed by a ReRun coherence response. Transactions receiving a ReRun response are said to have been ReRun'd. When the device that issued the ReRun response is ready to complete the transaction, it issues a ReRun transaction, with the tag of the original ReRun'd transaction, to local interconnect 5. The ReRun transaction causes the original requester to reissue the transaction at which time the coherence response phase can be completed.

Each of processing nodes 11–13 within NUMA computer system 10 may further include additional devices such as I/O devices (e.g., a display device, keyboard, or graphical pointer), non-volatile storage for storing an operating system and application software, and serial and parallel ports for connection to networks or attached devices. However, such devices are not deemed necessary for the understanding of the present invention and are accordingly omitted in order to avoid obscuring the illustration of the present invention.

B. Memory Organization

All of the processors in NUMA computer system 10, such as processors 14a–14c, share a single physical memory space, meaning that each physical address is associated with only a single system memory location. Thus, the overall contents of system memory, which can generally be accessed by any of the processors within NUMA computer system 10, can be viewed as partitioned between all the system memories. Taking the illustrative embodiment shown in FIG. 1 as an example, processor 14a addresses a 16 gigabyte address space including both a general purpose memory area and a reserved area. The general purpose memory area is preferably divided into 500 megabyte segments, with each of processing nodes 11–13 being allocated every third segment. The reserved area, which may contain approximately 2 gigabyte, includes system control and peripheral memory and I/O areas that are each allocated to a respective one of processing nodes 11–13.

For purposes of illustration, a processing node (such as processing node 11) that stores a particular datum in its system memory is said to be the home node for that datum. Conversely, the remaining processing nodes within the NUMA computer system (such as processing nodes 12 and 13) are said to be remote nodes with respect to the particular datum.

C. Memory Coherency

Because data stored within a local system memory, such as system memory 17, can be requested, accessed, modified, and cached by any one of processing node 11–13 within NUMA computer system 10, NUMA computer system 10 implements a cache coherency protocol to maintain coherency both between cache memories within the same local processing node and between cache memories within other remote processing nodes. Thus, NUMA computer system 10 can be properly classified as a cache coherent NUMA (CC-NUMA) computer system. The cache coherence protocol, most likely implementation-dependent, may comprise, for example, the well-known Modified, Exclusive, Shared, and Invalid (MESI) protocol or a variant thereof. Hereafter, it will be assumed that L1 caches 15a–15c, L2 caches 16a–16c, and arbiter 18 implement a modified MESI protocol, of which node controller 19 recognizes the Modified, Shared and Invalid states and consider the Exclusive state to be merged into the Modified state for correctness. In other words, node controller 19 assumes that data held exclusively by a remote cache is modified, regardless of whether or not the data has actually been modified.

D. Node Controller

Figure 2:
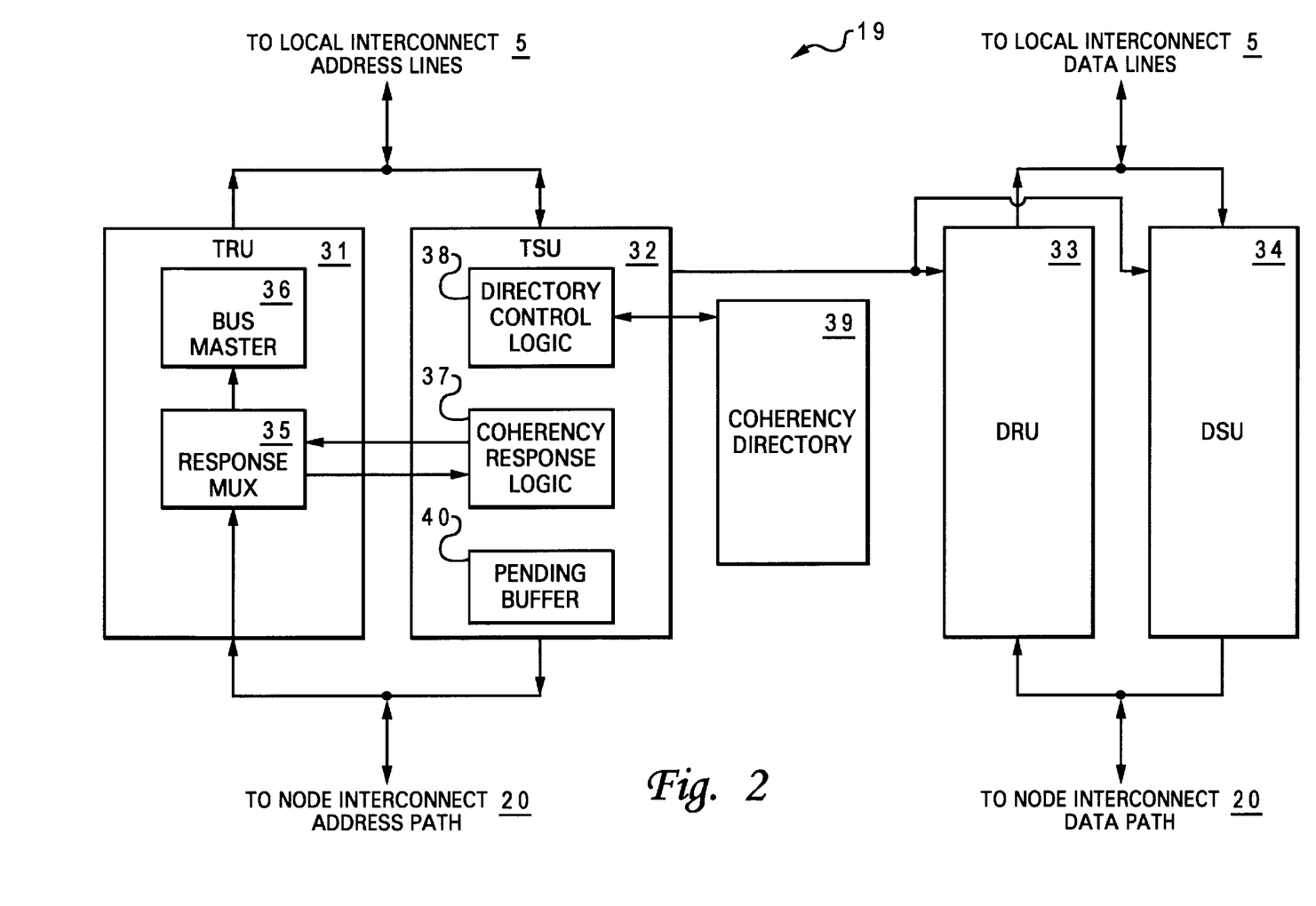
FIG. 2 is a detailed block diagram of a node controller in the NUMA computer system of FIG. 1.

With reference now to FIG. 2, there is illustrated a detailed block diagram of a node controller 19 in NUMA computer system 10 of FIG. 1. As shown, node controller 19, which is coupled between a local interconnect 5 and node interconnect 20, includes a transaction receive unit (TRU) 31, a transaction send unit (TSU) 32, a data receive unit (DRU) 33, and a data send unit (DSU) 34. As indicated, the address and data paths through node controller 19 are bifurcated, with address packets being processed by TRU 31 and TSU 32 and data packets being processed by DRU 33 and DSU 34.

TRU 31, which is so designated to indicate transaction flow off of node interconnect 20, is responsible for accepting address and coherency packets from node interconnect 20, issuing transactions on local interconnect 5, and forwarding responses to TSU 32. TRU 31 includes a response multiplexer 35, which receives packets from node interconnect 20 and passes selected packets to both bus master 36 and coherency response logic 37 within TSU 32. In response to receipt of a address packet from response multiplexer 35, bus master 36 may initiate a communication transaction on its local interconnect 5 that is the same as or different from the received address packet.

TSU 32, as indicated by its nomenclature, is a conduit for transactions flowing to node interconnect 20. TSU 32 includes a multiple-entry pending buffer 40 that temporarily stores attributes of communication transactions sourced to node interconnect 20 that have yet to be completed. The transaction attributes stored in an entry of pending buffer 40 preferably include at least the address (including tag) of the transaction, the type of the transaction, and the number of expected coherency responses from remote node who's caches may hold the line. A tag is a transaction identifier utilized to uniquely identify an active transaction in the system, and associate address transaction, and data on spit buses. Each pending buffer entry has an associated status, which can be set either to Null, indicating that once all responses are received that the pending buffer entry can be deleted, or to ReRun, indicating that TSU 32 should instruct TRU 31 to issue a ReRun request for the held tag once all responses are received. In addition to sourcing address packets on node interconnect 20, TSU 32 interacts with TRU 31 to process memory request transactions and issues commands to DRU 33 and DSU 34 to control the transfer of data between local interconnect 5 and node interconnect 20. TSU 32 also implements the modified coherency protocol (i.e., MSI protocol) for node interconnect 20 with coherency response logic 37 and maintains coherence directory 39 with directory control logic 38.

TABLE I

| Coherence directory state | Possible state(s) in local cache | Possible state(s) in remote cache | Meaning |
|---|---|---|---|
| Modified (M) | I | M, E, or I | Cache line may be modified at a remote node |
| Shared (S) | S or I | S or I | Cache line may be held non-exclusively at a remote node |
| Invalid (I) | M, E, S, or I | I | Cache line is not held by any remote node |
| Pending-shared | S or I | S or I | Cache line is in the process of being invalidated at remote nodes |
| Pending-modified | I | M, E, or I | Cache line, which may be modified at a remote node, is in the process of being written back to a system memory at the home node, possibly with invalidation at the remote node |

Coherence directory 39 stores indications of the system memory addresses of all data (e.g., cache lines) held by caches at remote nodes for which the local processing node is the home node. The address indication for each cache line is stored in association with an identifier of each remote processing node having a copy of the cache line and the coherency status of the cache line at each such remote processing node. Possible coherency states for entries in coherency directory 39 are summarized in Table I. As indicated in Table I, the knowledge of the coherency states of cache lines held by remote processing nodes is imprecise. This imprecision is due to the fact that a cache line held remotely can make a transition from S to I, from E to I, or from E to M without notifying the node controller of the home node.

E. Collision Detection

The pipeline nature of the address bus and the ability to extend coherency to a remote bus via a ReRun response cause complexity in the determination of a completion of a transaction and in the serialization of transactions that need to be serialized (or prioritized). Transactions that may interact and need to be serialized are said to "collide" with each other, and one of the transactions must be retried in accordance with the collision detection rules. Generally speaking, if an agent (such as a node controller) issues a memory request that is not ReRun'd, the agent is responsible for collision detection until the memory request is completed. If a request is ReRun'd, the agent that issues the ReRun response assumes responsibility for collision detection until the transaction is reissued by the original agent in response to a ReRun transaction indicating that the delayed coherency response for the transaction can now be resolved by the system.

II. Livelock Problem

The occurrence of a livelock situation on a multiprocessor bus is a common problem that must be prevented. Livelocks can occur when two agents on the bus are trying to access the same cache line. Typically, the bus has a detection protocol for detecting collisions and rules for ensuring coherency such that colliding transaction will be retried. However, it is possible that, under certain scenarios, two colliding transactions may continue to retry each other and no progress can be made. In the prior art, there are mechanisms to avoid livelocks through random delay before a Retry'd transaction is issued again. The delay length is a function of the time for the coherence to be resolved on the bus. In a SMP single bus computer system, this delay tends to be on the order of a few ten's of cycles. In a NUMA computer system, the additional delay introduced by the interconnect crossing and the time to resolve the coherency is long enough to prevent the SMP livelock solution from being effective in these larger systems. Therefore, a better solution to a livelock problem is required for the NUMA computer system.

Figure 3:
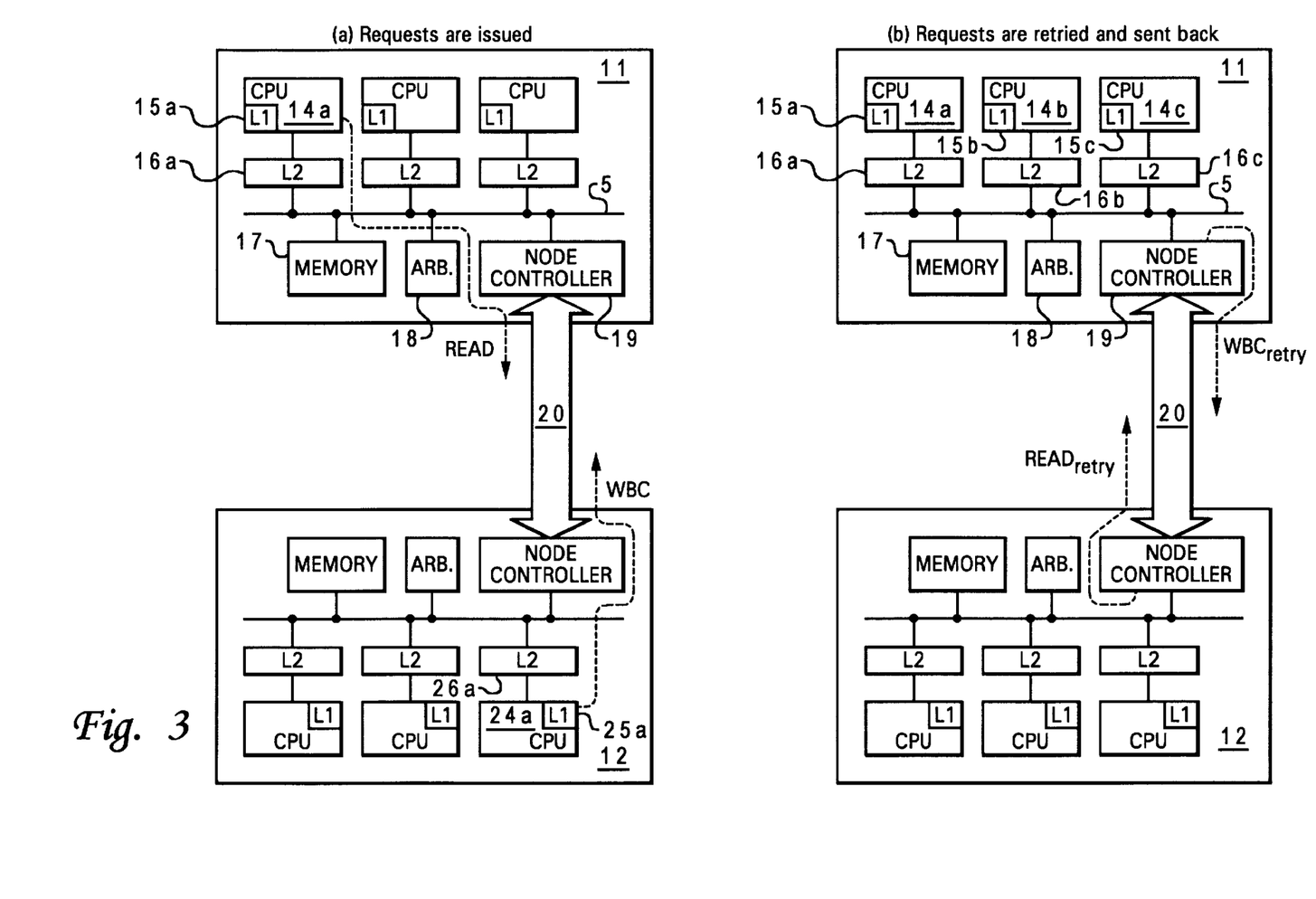
FIGS. 3a and 3b are an illustrative example of a livelock situation caused by a colliding writeback.

Referring now to FIGS. 3a and 3b, there is depicted an illustrative example of a livelock situation caused by a colliding writeback. As shown, if a processor 24a at a remote node 12 has a modified cache line within L1 cache 25a or L2 cache 26a, and processor 24a intends to cast the modified cache line out, processor 24a will issue a writeback request, such as a write-back-clean (WBC) request, to node controller 19 at home node 11. Thus, in this example, remote node 12 is the owning node. If, at the same time, processor 14a at home node 11 intends to read the cache line, processor 14a will issue a READ request onto bus 5. Node controller 19 will observe the READ request and note that the directory indicates that the cache line is possibly modified in node 12. Node controller 19 will ReRun the READ request from processor 14a, and node controller 19 will issue an identical READ request to node 12, via node interconnect 20, attempting to fetch the modified data back from node 12, as shown in FIG. 3a.

When the WBC request is received at home node 11, the WBC request will collide with the outstanding READ request and the WBC request will be retried back to remote node 12 by node controller 19 at node 11. Likewise, when the READ request is received at remote node 12, the READ request will collide with the outstanding WBC request and the READ request will be retried back to home node 11 by node controller 19 at node 12. Hence, both the WBC request and the READ request will be retried repeatedly from this point on, and as a result, a livelock situation is created, as shown in FIG. 3b.

III. Solution to Livelock Problem

A preferred solution to the above-mentioned livelock situation is to recognize that the WBC request issued by node 12 carries the same data that the READ request issued by node controller 19 at node 11 is attempting to fetch back to system memory 17 at node 11. Thus, the WBC request can be allowed to complete even though it collides with the outstanding READ request. As an implementation example, the cache coherence directory within node controller 19 at node 11 can be constructed to determine when a WBC request is received from the owning node for a cache line at the same time that an outstanding request is attempting to fetch back the cache line from the owning node. A combination of coherence directory states and occupancy vectors is utilized to identify this specific condition and the node controller owning collision detection on the READ request.

Figure 4:
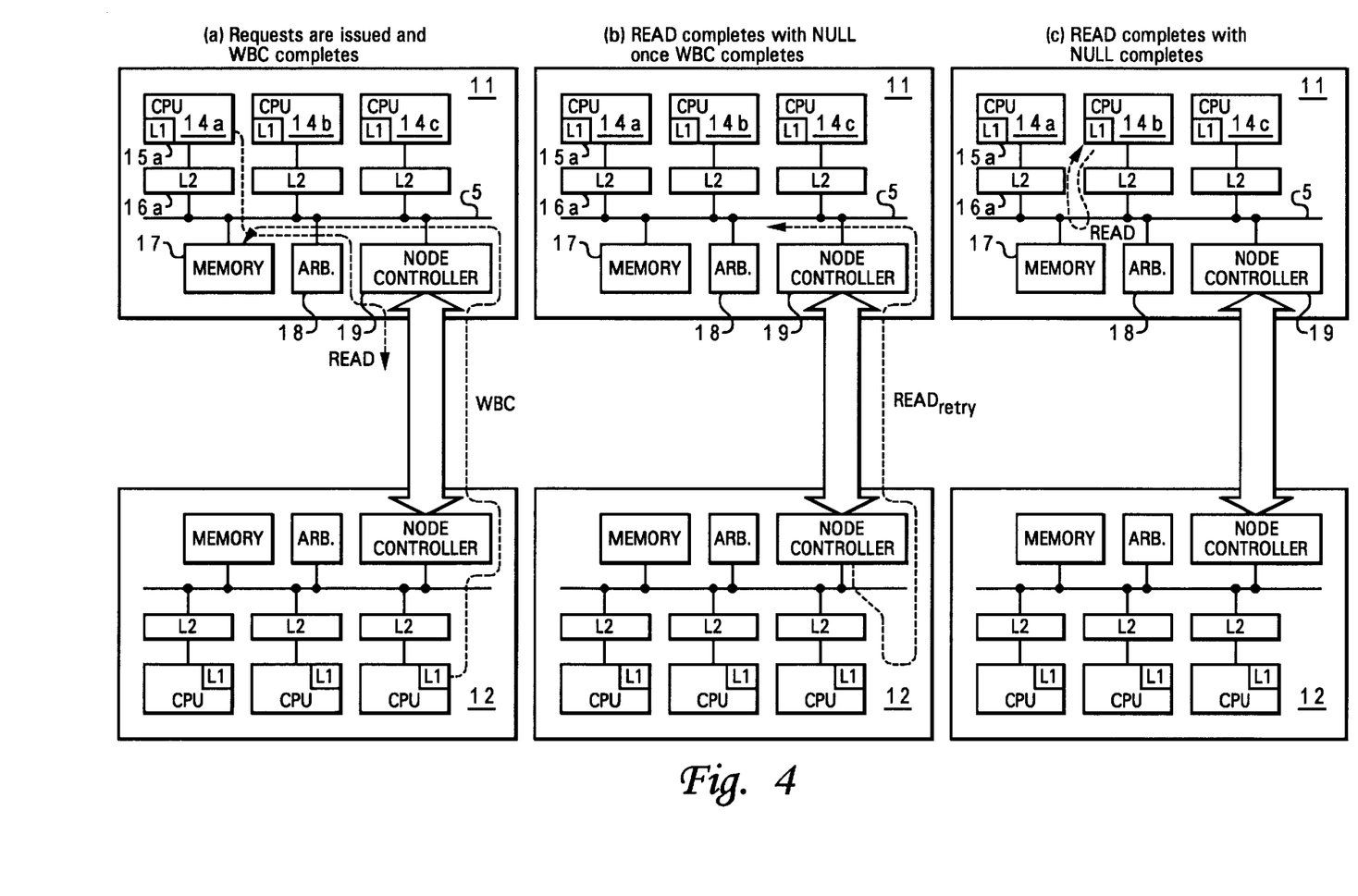
FIGS. 4a, 4b and 4c are an illustrative example of a solution to the livelock situation caused by a colliding writeback, in accordance with a preferred embodiment of the present invention.

For example, referring now to FIGS. 4a and 4b, a WBC is initially issued to home node 11 from node 12 at about the same time a READ request, for example, is issued at home node 11 for the same cache line by either a local processor or a remote processor (at a remote node 13) via the TRU unit within node controller 19. The READ request is then retried at remote node 12 as a result of a collision with the outstanding WBC request, but the WBC request is allowed to complete at home node 11 even though there is technically a collision, because the above-mentioned criteria is met, as shown in FIG. 4a.

The READ is then retried back to home node 11, as shown in FIG. 4b. Finally, the READ request is reissued by processor 14a at home node 11, system memory 17 supplies the valid data, and the READ request completes successfully with a clean response, as shown in FIG. 4c. As such, the livelock situation is avoided. System memory 17 is allowed to supply the data because it was updated with valid data by the WBC.

Figure 5:
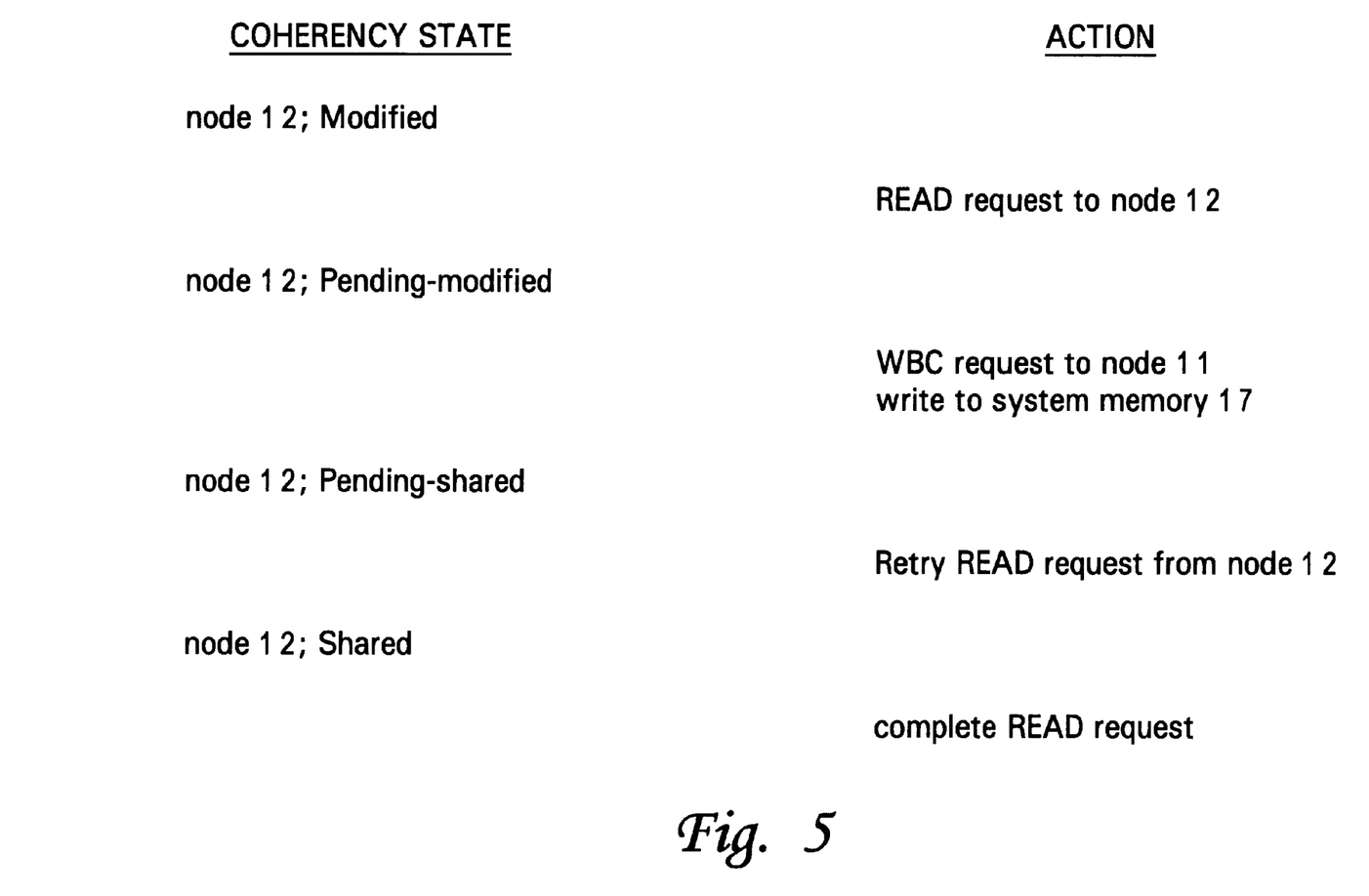
FIG. 5 is a summary of various coherency states of the requested cache line within the cache coherence directory during the resolution of the livelock situation shown in FIGS. 4a–4c, in accordance with a preferred embodiment of the present invention.

Referring now to FIG. 5, there is depicted a summary of various coherency states of the requested cache line within the coherency directory during the resolution of the livelock situation shown in FIGS. 4a–4c, in accordance with a preferred embodiment of the present invention. Initially, the coherency state of the requested cache line in remote node 12 is denoted within the coherency directory as Modified in node 12. A READ request to the Modified cache line is then made by processor 14a. The node controller forwards the READ request to remote node 12 and moves the coherency state to Pending-Modified. When the WBC request is received at home node 11, the coherency state is found to be Pending-Modified with remote node 12 as the owning node. This allows the node controller to infer that this is the valid data which the node controller is attempting to fetch back and that it can allow the WBC request to complete at home node 11 (i.e., the modified data is written to system memory 17), which violates the collision detection rules to avoid livelock but still maintain correct data consistency. Once the WBC request is completed, the node controller changes the coherency state to Pending-Shared to indicate that the READ request to the cache line is still pending, but the cache line is valid in system memory 17 of home node 11. When the outstanding READ request is returned from remote node 12 with a Retry or Shared response, the coherency state is moved to a Shared. When the READ request is retried by processor 14a, the data is supplied from system memory 17 at home node 11.

Figure 6:
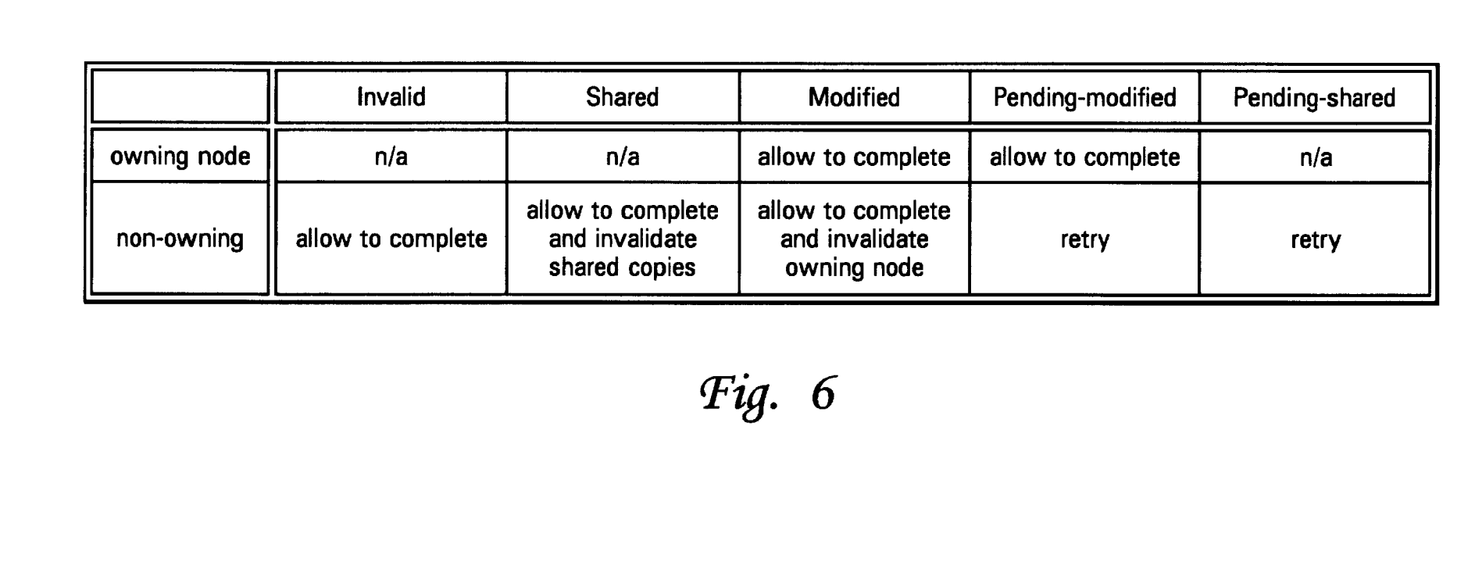
FIG. 6 is a summary of all possible coherency states and actions taken when a write back request is received, in accordance with a preferred embodiment of the present invention.

With reference now to FIG. 6, there is depicted a summary of all possible coherency states and actions taken when a WBC request is received, in accordance with a preferred embodiment of the present invention. As shown, a WBC request from an owning node to a cache line in a Pending-modified state is allowed to complete, thus violating the collision detection rules, while still maintaining data consistency. A WBC request from a non-owning node, however, must still be retried. As has been described, the present invention provides an improved method for avoiding livelocks due to colliding writebacks within a NUMA computer system.

While the invention has been particularly shown and described with reference to a preferred embodiment, it will be understood by those skilled in the art that various changes in form and detail may be made therein without departing from the spirit and scope of the invention.

What is claimed is:

1. A method for avoiding livelocks due to a colliding writeback within a non-uniform memory access (NUMA) computer system, wherein said NUMA computer system includes at least two nodes coupled to an interconnect, each of said at least two nodes includes a local system memory, said method comprising the steps of:

in response to an attempt by a processor located at a remote node to writeback a modified cache line to a home node of said modified cache line substantially simultaneously with an attempt by a processor located at said home node to access said modified cache line at said remote node via a memory request, allowing said writeback to complete at said home node without retry only if said remote node is considered as an owning node of said modified cache line;

retrying said memory request at said home node; and completing said memory request at said home node.

2. The method according to claim 1, wherein said memory request is any request that requires data to be flushed from an owning node.

3. The method according to claim 1, wherein said completing step further includes a step of completing said memory request at said home node with a clean response.

4. The method according to claim 1, wherein said allowing step is performed by a node controller within said home node.

5. The method according to claim 4, wherein said allowing step is performed in accordance with coherency states.

6. A non-uniform memory access (NUMA) computer system capable of avoiding livelocks due to a colliding writeback, wherein said NUMA computer system includes at least two processing nodes coupled to an interconnect, each of said at least two processing nodes includes at least one processor having at least a local cache memory and a local system memory, said NUMA computer system comprising:

means for allowing a writeback request to complete at a home node without retry only if a remote node is considered as an owning node of a modified cache line, in response to an attempt by a processor located at a home node to access said modified cache line at said remote node via a memory request substantially simultaneously with an attempt by a processor located at said remote node to writeback said modified cache line;

retrying said memory request at said home node; and retrying completing said memory request at said home node.

7. The NUMA computer system according to claim 6, wherein said memory request is any request that requires data to be flushed from an owning node.

8. The NUMA computer system according to claim 6, wherein said completing means further includes a means for completing said memory request at said home node with a clean response.

9. The NUMA computer system according to claim 6, wherein said allowing means is a node controller within said home node.

10. The NUMA computer system according to claim 9, wherein said node controller includes coherency states.

* * * * *